S. HEATH.
MEASURING INSTRUMENT.
APPLICATION FILED APR. 20, 1911.
1,245,340.
Patented Nov. 6, 1917.
2 SHEETS—SHEET 1.
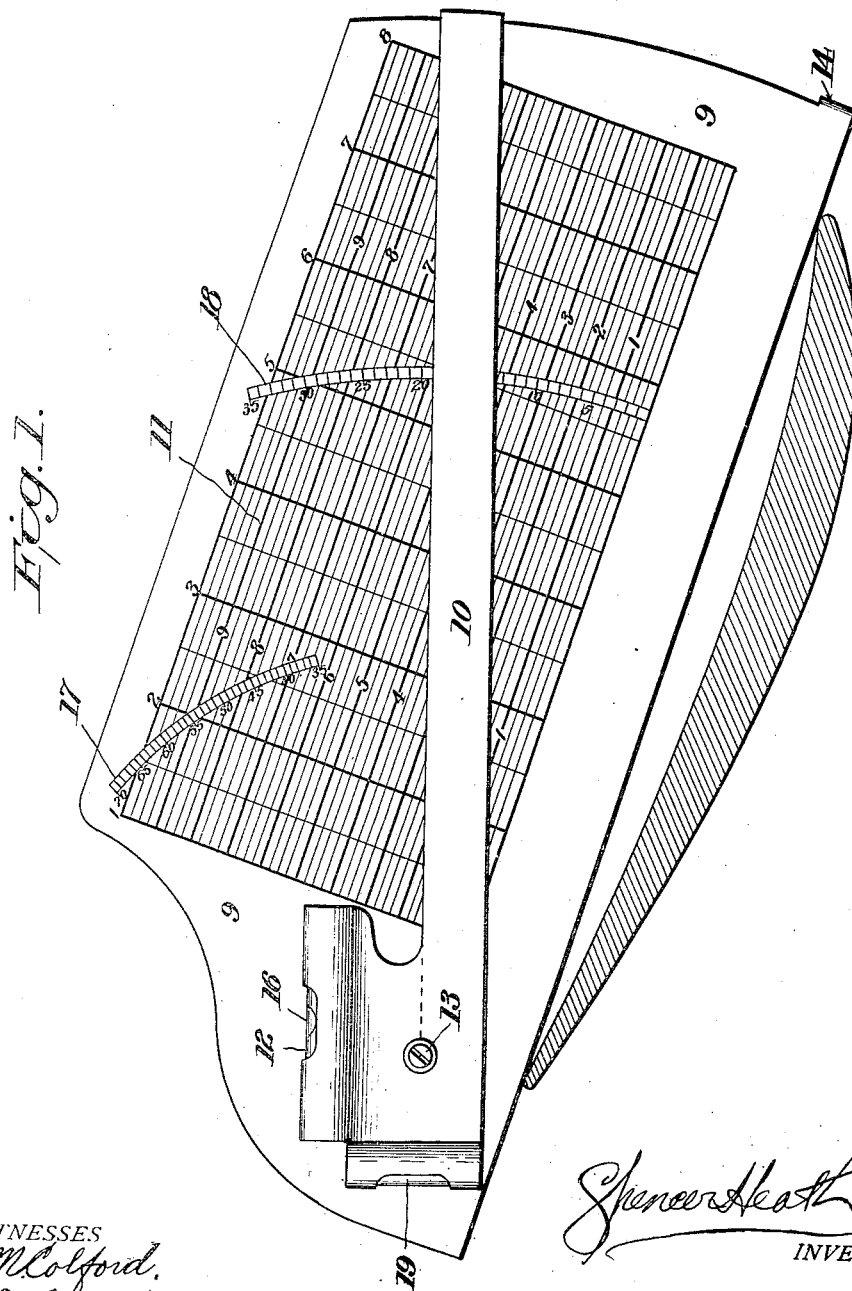
WITNESSES
E. M. Colford.
N. E. Loental.
Spencer Heath
INVENTOR

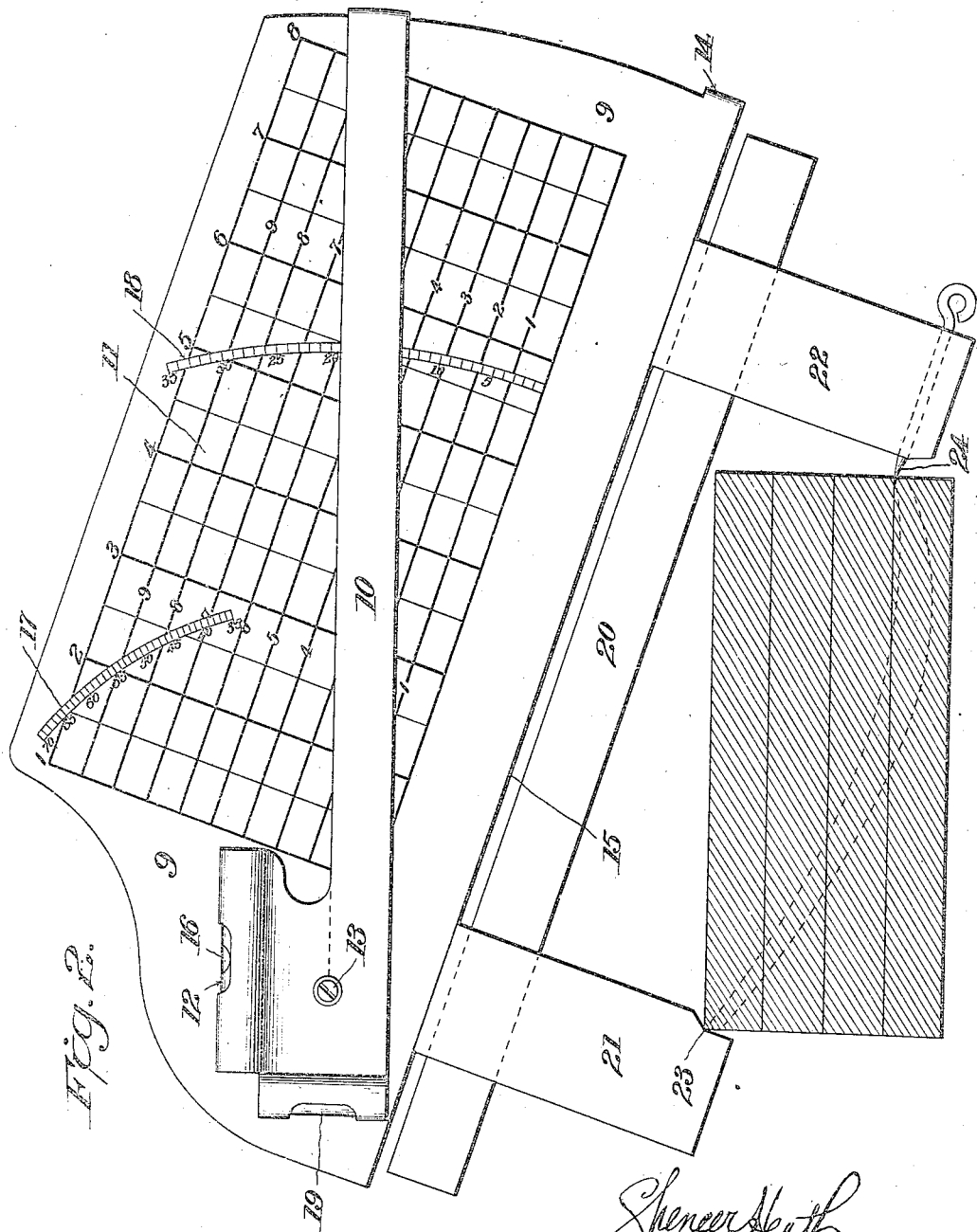

UNITED STATES PATENT OFFICE.

SPENCER HEATH, OF WASHINGTON, DISTRICT OF COLUMBIA, ASSIGNOR TO AMERICAN PROPELLER AND MANUFACTURING CO., A CORPORATION OF MARYLAND.

MEASURING INSTRUMENT.

1,245,340.

Specification of Letters Patent.

Patented Nov. 6, 1917.

Original application filed August 27, 1910, Serial No. 579,308. Divided and this application filed April 20, 1911. Serial No. 622,184.

*To all whom it may concern:*

Be it known that I, SPENCER HEATH, a citizen of the United States, residing at Washington, in the District of Columbia, have invented a new and useful Measuring Instrument, of which the following is a specification.

This invention relates to means for measuring propellers, and has for its object to provide accurate and convenient means for measuring the pitch, angles, etc., of a propeller at any part of the blade.

With the above and further objects in view which will appear, I have invented the subject-matter set forth by means of the accompanying drawings which form a part of this specification and in which, Figure 1 is an elevation of my improved pitch indicating means applied to a propeller blade, and Fig. 2 shows a pitch reading instrument as used for laying off a rough propeller block.

The instrument consists of a plate 9 carrying a pivoted arm or blade 10 and inscribed with a diagram 11 from which readings are taken for different positions of the blade. The arm 10 near its pivotal attachment 13 is provided with a spirit level 12 parallel with its length. A lug 14 stops the arm in its lowermost position parallel with the lower edge or base 15 of the plate 9 and with this blade position the instrument may be used as an ordinary level.

The diagram 11 consists of a series of vertical numbered lines with the spaces between them representing units of a propeller diameter, and a series of horizontal numbered lines marking off intervals representing units of pitch. The unnumbered light lines in each series are merely for the purpose of giving intermediate or fractional readings. The ratio between the units of pitch and the units of propeller diameter is 1 to 3.14159— so that any line drawn from the pivot 13 to any intersection representing a certain pitch and diameter has the same pitch slope or inclination as a helix of corresponding diameter and pitch. To read the pitch, therefore, of any propeller blade it is only necessary to place the propeller with its axis vertical, mark off (with chalk or otherwise) intervals of blade length corresponding to different diameters, lay the instrument across the propeller blade at the marked-off points of division, raise the arm, until it is level as indicated by the bubble at 16 and then take the vertical reading at the point where the edge of the blade or arm crosses the vertical line indicating the same diameter as the point on the propeller blade where the instrument is set. This gives at a glance the pitch readings at different points along the blade. These readings may be tabulated for reference or plotted on a diagram.

The diagram 11 on the instrument is also furnished with a scale of angles in degrees, so that the instrument may be used as a protractor as well as an indicator of pitch and the blade angle may be read in degrees for every pitch reading. The protractor scale is in two portions 17 and 18, the portion 18 being placed more remote from the center to admit of coarser and more accurate graduations.

In Fig. 1 if the instrument rests on the blade at a point where it sweeps a circle having a diameter of six, then the pitch is seen to be six and one-half and the blade angle nineteen degrees. If the diameter at the point measured is five, then the pitch reading is about five and one-half, the angle, of course, remaining the same. Any units may be employed, as feet, inches, centimeters, etc.

The instrument may be used as a ready means for calculating the gliding angles of any propeller blade at different points, the working pitch or actual advance forward per revolutions being known or assumed. To do this the blade angles from point to point on the blade are taken and noted down. The angles of the working-pitch or of the helices traversed by the blade at corresponding points are then taken and the difference between the two sets of readings in degrees gives the respective gliding angles of the blade. These may be plotted for reference or comparison. To read the angle of any working pitch the arm of the instrument is placed on that pitch reading for the given diameter and the reading of the angle in degrees for this position is taken.

The arm 10 has an additional spirit level 19 at right angles to its length and to the level 12. This level 19 is used in case the axis of the propeller to be measured should be more conveniently placed in a horizontal instead of a vertical position, as usually occurs when the propeller is mounted on a machine.

In Fig. 2 the pitch reading instrument is applied to a rough propeller block for the purpose of laying off the block so that it can be hewn down to the desired pitch at any point on the blade.

A beam 20 is provided with two right-angle members 21 and 22, one or both of these members being slidable on the beam. Member 21 has a notch 23 to rest on the upper side of the propeller block and member 22 is provided with an awl or marker 24 to lay off the point down to which the block must be hewn to get the desired pitch. The notch 23 and marker 24 are equidistant from the upper ends of members 21 and 22 and also from the beam 20.

For laying off the block at any diameter or distance from the center the arm 10 is moved to the position which indicates the pitch desired at the given diameter. With this setting the instrument is placed across the upper ends of members 21 and 22 as in Fig. 2, or on the beam 20 and the marker 24 is brought to the elevation at which the bubble in the level 12 is neutral. The point then indicated by the marker is the point to which the block must be hewn down to obtain the desired pitch. This process may be repeated at several places along the block corresponding to different diameters and the series of pitch points thus obtained by the marker may be joined by a smooth line down to which the block must be hewn.

It is, of course, obvious, that the parts may be so modified that the base of the instrument will lie directly on the beam, or the members 21 and 22 could be integral with or attached directly to the lower edge of the plate instead of the beam 20.

This application is in part a division of my co-pending application filed August 27, 1910, Serial No. 579,308.

What I claim is:

1. A screw pitch measuring instrument comprising in combination a plate having an extensive diagram display area and a working edge adapted to co-act with the surfaces of the screw to be measured, a blade pivoted on said plate for angular movement over said diagram display area and a leveling device mounted on said blade, said diagram display area being provided with rectangular coördinate lines having a common origin on the plate at the pivotal point of said blade, and one of the series of coördinate lines being parallel and the other perpendicular to the working edge of said plate, the unit space intervals between the lines in one series being related to the corresponding intervals in the other series in the ratio that the circumference of a circle bears to its diameter.

2. The combination with a pitch reading instrument, comprising a plate having a diagram and a level-arm adapted to swing across said diagram, of means connected with the base of said plate for designating on a propeller block points equidistant from said base when the instrument is in various angular positions, said means comprising two relatively adjustable members adapted to locate points on the propeller block equidistant from the base of said plate.

3. Means for laying off a propeller block comprising a bar, two perpendicular members mounted thereon, one of said members having a notch and the other having a marker, said notch and marker being equidistant from the tops of the members, and a pitch reading instrument adapted to lay across the tops of the members, said pitch reading instrument comprising a plate having a diagram, and a level-arm adapted to swing across said diagram.

4. The combination with a pitch measuring instrument having a working edge of two members projecting therefrom, said members being adjustable along the working edge of the instrument, said instrument comprising a plate having a diagram with intersecting lines indicating diameter and pitch and a pivoted level arm adapted to swing across said diagram.

SPENCER HEATH.

Witnesses:
N. CURTIS LAMMOND,
N. E. COSTELLO,
L. C. HOLMES.

Copies of this patent may be obtained for five cents each, by addressing the "Commissioner of Patents, Washington, D. C."